United States Patent [19]

Polaert et al.

[11] Patent Number: 5,423,227
[45] Date of Patent: Jun. 13, 1995

[54] DEVICE FOR GENERATING MULTI-DIRECTIONAL COMMANDS

[75] Inventors: Rémy Polaert, Villecresnes; Francois Maniguet, Marles en Brie; Jean-Pierre Damour, Brunoy, all of France

[73] Assignee: U.S. Philips Corporation, New York, N.Y.

[21] Appl. No.: 968,546

[22] Filed: Oct. 29, 1992

[30] Foreign Application Priority Data

Oct. 30, 1991 [FR] France .................. 91 13410
Dec. 18, 1991 [FR] France .................. 91 15723

[51] Int. Cl.6 .................................. G01L 3/00
[52] U.S. Cl. ................. 73/862.044; 73/862.043; 73/862.634
[58] Field of Search ............... 73/862.041, 862.042, 73/862.043, 862.044, 062.045, 105, 862.632, 862.634, 862.541; 200/244, 246, 332

[56] References Cited

U.S. PATENT DOCUMENTS

| | | | |
|---|---|---|---|
| 2,487,681 | 11/1949 | Weisselberg | 73/862.634 X |
| 2,597,751 | 5/1952 | Ruge | 73/862.632 X |
| 3,264,442 | 8/1966 | Holzer | 200/244 |
| 3,600,543 | 8/1971 | Nakada | 200/246 |
| 3,978,303 | 8/1976 | Miyata | 200/246 |
| 4,063,056 | 12/1977 | Baker | 200/332 |
| 4,394,553 | 7/1983 | Feil | 200/332 X |
| 4,411,159 | 10/1983 | Spear et al. | 73/862.632 |
| 4,423,640 | 1/1984 | Jetter | 73/862.634 |
| 4,429,756 | 2/1984 | Jacobsen et al. | 73/862.632 X |
| 4,501,160 | 2/1985 | Johnson | 73/862.634 X |
| 4,621,533 | 11/1986 | Gindy | 73/862.045 |
| 4,680,577 | 7/1987 | Straayer et al. | 340/711 |
| 4,718,287 | 1/1988 | Mishliborsky | 73/862.632 |
| 4,759,416 | 7/1988 | Voorhorst | 73/862.632 X |
| 4,867,259 | 9/1989 | Yung | 177/211 |
| 4,905,523 | 3/1990 | Okada | 73/862.044 |
| 4,982,618 | 1/1991 | Culver | 74/471 XY |

FOREIGN PATENT DOCUMENTS

9000293 1/1990 WIPO .

*Primary Examiner*—Richard E. Chilcot, Jr.
*Assistant Examiner*—Elizabeth L. Dougherty
*Attorney, Agent, or Firm*—David Schreiber

[57] ABSTRACT

A device for generating multi-directional commands, comprising at least one plate provided with strain gauges ($R_1$-$R_4$) ($R_5$-$R_8$) which detect the multi-directional deformations incurred by the plate under the influence of a force F exerted on a surface of the plate. One of the extremities of the plate cooperates with a support and the plate bears, by way of its other surface, on a fulcrum at the other extremity. The fulcrum may be formed by the head of a microswitch, the extremity of the plate being linked to the support. The microswitch is capable of controlling operations for the activation of the device and/or the validation of the electric signals from the strain gauges. The orientation of the force F with respect to the axis of the fulcrum enables the issue of multi-directional commands. The device has a shape ergonomically adapted to handling by means of a single hand.

14 Claims, 5 Drawing Sheets

DEVICE FOR GENERATING MULTI-DIRECTIONAL COMMANDS

BACKGROUND OF THE INVENTION

The invention relates to a device for generating multi-directional commands, comprising at least one elongate member having a first and a second extremity, the member being provided with strain gauges which detect the multi-directional deformations incurred by the member under the influence of a force exerted near the second extremity, the first extremity cooperating with a support.

A device of this kind is known, for example from the document GB-A-2 211 280 which describes a device in the form of a joystick which consists of a rod whose cross-section has been locally reduced so as to make the rod deformable in several directions. These narrowed portions are provided so as to receive the strain gauges which detect the deformations. The rod constitutes the centre of a stick which can be manipulated by hand. The rod can move within a conical volume around one of its extremities, the mobile extremity being displaced in all directions perpendicular to the rod. This command device is rather voluminous and its manufacture is expensive.

On the other hand, when the joystick has performed the displacement desired by the user, it is necessary to validate the electric signals from the strain gauges. The execution of this function is not dealt with by the cited document.

SUMMARY OF THE INVENTION

It is a main object of the invention to propose a device for generating multi-directional commands which is substantially less voluminous and whose manufacture is substantially simpler. Because the intended applications are in the field of mass products, simplified manufacture should lead to lower costs.

The main object is achieved by means of a device which is characterized in that the elongate member is formed by a plate, the second extremity bearing, by way of a surface of the plate, on a fulcrum which is integral with the support.

The fulcrum constitutes a bearing point. Depending on the orientation of the resultant of the force applied to said bearing point, the deformation incurred by the plate will be of a different type (deflection, torsion). Strain gauge bridges arranged for the selective detection of given types of deformation determine the orientation and the intensity of the force applied.

When the force is exerted by means of a button provided on the second extremity so as to face the fulcrum, a multi-directional command is obtained which can be triggered by a finger. The orientation and intensity of said command can be controlled by inclining and pressing the button more or less. When the force is not exerted opposite to the fulcrum, the relevant directions will be situated within a limited range.

It is a secondary object of the invention to achieve that validation of said electsic signals from the strain gauges can be readily performed and perceived by the user at low cost.

The secondary object is achieved by means of a device in which the fulcrum comprises a microswitch, the button serving to activate at least one contact means of said microswitch, the first extremity of the plate cooperating pivotably with the support by way of a linkage means.

Thus, by exerting a force on the plate, via a single motion the user will not only form an electric command but will also perceive the action as a result of the mechanical "click" produced by the microswitch.

The microswitch may comprise a single contact means whose activation causes validation of the electric signals from the strain gauges.

The microswitch may also comprise two contact means, a first contact means being activated by a small applied force F1 and a second contact means being activated by a second applied force F2 which is greater (F2>F1), the first contact means controlling an activation of the device and the second contact means controlling the validation of said electric signals.

In a further embodiment, the device may comprise a microswitch, having a contact means, and also a further microswitch which is arranged on the second surface of the plate so as to be coaxial with said microswitch, one of the two microswitches being activated by a small applied force F1 in order to control an activation of said device, the other microswitch being activated by an applied force F2 which is greater (F2>F1), in order to control the validation of said electric signals.

For operation it is necessary that the head of the microswitch is displaced relative to the support, for example it should intrude into the body of the microswitch, but at the same time a portion must still project so as to act as a fulcrum. This displacement must be accompanied by a displacement of the first extremity of the plate as a result of a slight rotation which is enabled by a linkage means arranged between the support and the plate.

This linkage means may be formed by a shaft mounted on pads. It may also be formed by a deformable elastic portion, for example a leaf spring or a plate of a plastic material.

The feasible displacement of the head of the microswitch is per definition limited. In this situation, it is desirable that excessive forces applied are not taken up by the microswitch which could otherwise be destroyed. To this end, the device may be provided with means for limiting the force exerted on the microswitch. Nevertheless, for correct operation the microswitch should still be exposed to a force appropriate for correct operation.

By applying the force along the axis of the head of the microswitch, the contact means and the mechanical click of the microswitch are activated.

By applying the force slightly outside the axis of the head of the microswitch, directional commands can be given in all directions parallel to the plate and around the microswitch.

The plate could be formed by partly cutting a board so that the first extremity of the plate remains integral with the board and the second extremity of the plate is mobile.

A device of this kind can either be used in a mobile or fixed autonomous way (remote control) or be connected to an apparatus to be controlled.

In order to protect the plate and the strain gauges from external influences, they can be arranged in a housing which comprises deformable portions which serve to connect the button to a part of the housing. The housing may act as the support. It may be made of a moulded plastics. The first extremity of the sheet is then attached to other parts of the housing. The linkage means may notably be formed by an elastic portion, for example a sheet, which is moulded so as to be integral with the housing.

When the device operates autonomously, the electric means for transforming the electric signals supplied by the strain gauges into signals suitable for transmission are also arranged within the housing.

An autonomous mobile device may be an infrared remote control. A fixed autonomous device may be, for example a wall box controlling actuators, for example by way of infrared radiation.

These and other aspects of the invention will become apparent from and be illustrated on the basis of embodiments to be described hereinafter.

BRIEF DESCRIPTION OF THE DRAWINGS

The invention will be better understood on the basis of the following Figures which are given by way of non-limitative examples; therein.

DETAILED DESCRIPTION OF THE PREFERRED EMBODIMENTS

FIGS. 1, 2, 3, 4A and 4E relate to an embodiment comprising a fulcrum which is fixed relative to a support. The FIGS. 5A, 5B, 6, 7A, 7B, 8, 9A, 9B, 10, 11, 15 relate to an embodiment in which the fulcrum is mobile relative to the support.

Figure 1:
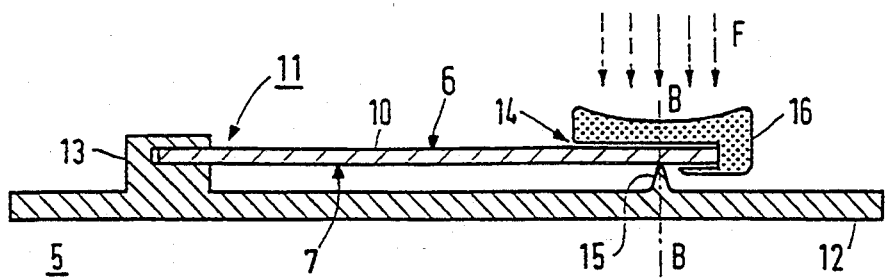
FIG. 1 is a diagrammatic sectional view of the essential members of a device in accordance with the invention, the plate being in a state of equilibrium.
Figure 18:
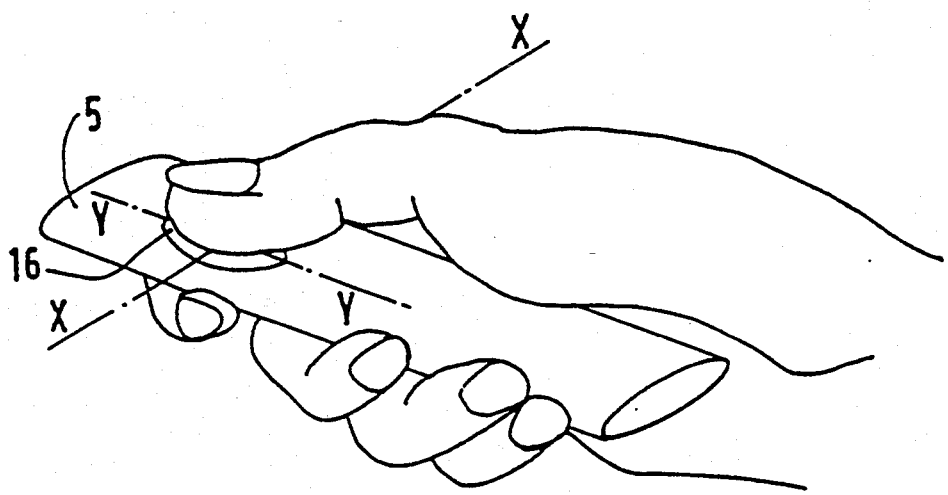
FIG. 18 is a general view of a hand-held remote control.

FIG. 1 is a diagrammatic longitudinal sectional view, taken along the axis AA, of the essential pans of the device 5 (FIG. 18). The dimensions are not shown to scale. One extremity 11 of the plate 10 is rigidly or flexibly retained in a ridge 13 on a support 12. The other extremity 14 of the plate 10 bears, by way of a surface 7, on a fulcrum 15. In reaction with the fulcrum 15, a force F can be applied to the surface 6 of the plate either between the ridge 13 and the fulcrum 15 or beyond the fulcrum 15. When the device is conceived to be controlled by way of a finger, for example a thumb, a button 16 is provided at the extremity 14 of the plate so as to bear on the fulcrum 15. A button having a concave shape is very well adapted to receive a finger. Thus, without lifting the finger the orientation of the force can be modified by inclining the finger more or less. These situations are shown in the FIGS. 2 and 3.

Figure 2:
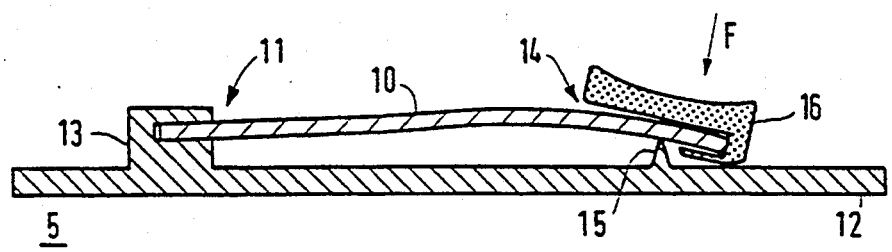
FIGS. 2 and 3 are two diagrammatic sectional views of the device, showing the deformations of the plate for the inclinations north and south.

In the case of FIG. 2, the force F is applied beyond the fulcrum 15. The deformation of the plate 10 is then such that the plate 10 moves away from the support 12 between the ridge 13 and the fulcrum 15.

Figure 3:
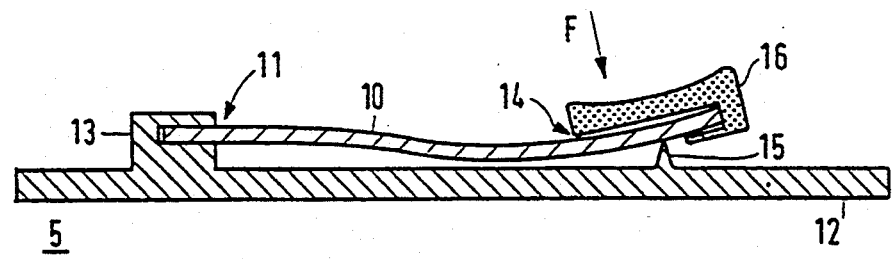

Analogously, FIG. 3 shows the situation where the force F is applied between the ridge 13 and the fulcrum 15. The deformation of the plate 10 then takes place so that the plate 10 moves towards the support 12 between the ridge 13 and the fulcrum 15. In both situations the plate 10 incurs an S-shaped deformation, i.e. it exhibits simultaneously compression zones and extension zones.

For a suitable understanding of the operation the S-shaped deformation is shown at an exaggerated scale in the FIGS. 2 and 3. Actually, the deformation is small and the longitudinal displacement of the plate on the fulcrum 15, caused by deflection, remains microscopically small. For example, for a ceramic plate having a length of 50 mm, the maximum deflection is in the order of from 0.1 to 0.5 mm, necessitating only a fulcrum having approximately that height.

Figure 4A:
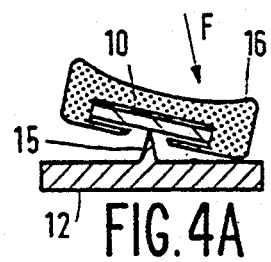
FIGS. 4A and 4B are two diagrammatic sectional views of the device for the inclinations west and east.
Figure 4B:
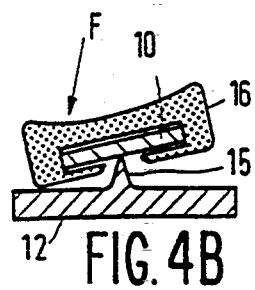

For designation of the commands, the terms north and south can be adopted for the situations shown in the FIGS. 2 and 3, respectively, because of the fact that, when the device is held in the hand, the commands of FIGS. 2 and 3 are directed upwards and downwards, respectively. Using the same terminology, the FIGS. 4A and 4B represent the commands east and west, respectively. These Figures are a sectional view, BB, through the fulcrum 15 (FIG. 18). The extremity 14 of the plate 10 may thus be inclined to one side or the other under the influence of the force F. Because the other extremity 11 is located in the ridge 13, torsional deformation of the plate 10 will occur.

Figure 13:
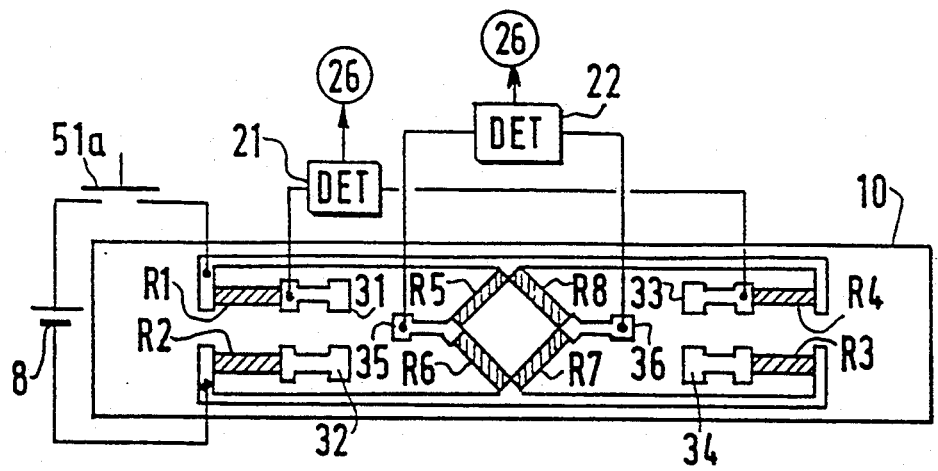
FIG. 13 shows a diagram of the arrangement of two strain gauge bridges on the plate for the measurement of deflection and torsion.

In order to measure the deformation incurred by the plate 10, it is provided with strain gauges. They are arranged on the plate 10 so as to measure selectively given types of deformation. Deflection deformation is measured by means of a first strain gauge bridge and torsional deformation is measured by means of a second strain gauge bridge. FIG. 13 shows a first bridge $R_1$, $R_2$, $R_3$, $R_4$ which is arranged in the longitudinal direction on the plate 10, and a second bridge $R_5$, $R_6$, $R_7$, $R_8$ which is arranged at an angle of 45° with respect to the longitudinal axis of the plate 10. For clarity of FIG. 13, not all electrical connections are shown; notably the terminal 31 must be connected to the terminal 34 and the terminal 32 must be connected to the terminal 33 so as to obtain correct operation of the first bridge $R_1$, $R_2$, $R_3$, $R_4$. Actually, the adjacently arranged resistances $R_1$ and $R_2$, (or $R_3$ and $R_4$), incur the same deformation and need not have a common connection for correct operation of the bridge. The first bridge is provided in two parts which are situated near the extremities of the plate in zones in which maximum extension and compression strains occur. Similarly, the second bridge is arranged near the centre of the plate 10 in a zone in which the torsional deformation is maximum. The deformation detection sensitivity is thus optimum. The two bridges are fed by a source 8 and two detection circuits DET 21, 22 detect tensions disturbing the equilibrium of each bridge.

The detection circuits 21 and 22 are formed, for example by amplifiers comprising low-frequency filters (integrators), and supply control signals to the devices to be manipulated.

Figure 14:
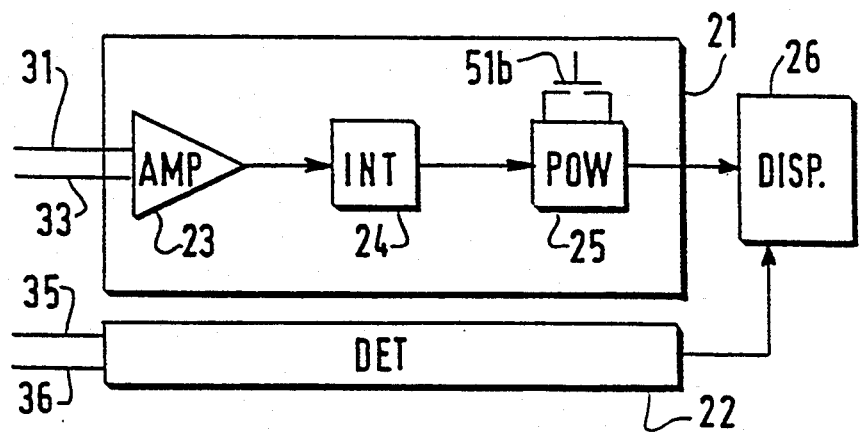
FIG. 14 is an electrical diagram of a control circuit for connection via a wire.

FIG. 14 shows an example of the electrical diagram of a detection circuit DET which is connected between the terminals 31 and 33 of the first strain gauge bridge $R_1$, $R_2$, $R_3$, $R_4$. The controlled device 26 is, for example a monitor DISP. The deflection of the plate causes a potential difference between the terminals 31 and 33, which difference is amplified by the amplifier 23 and is suppressed or integrated while passing through a low-frequency filter, for example an integrator INT 24, after which an electronic circuit POW 25 of adapted power applies the appropriate signal to the controlled device 26. A second detection circuit DET 22, being analogous to the circuit 21, operates in the same way or the second strain gauge bridge. In order to obtain incremental control, the integrator 24 may sum increment/decrement values.

Figure 5:
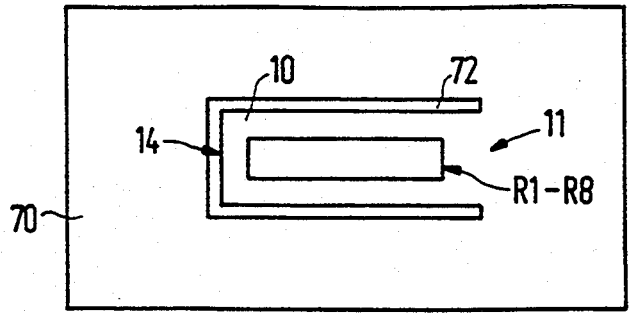
FIG. 5 shows a plate partly cut out from a board.

The various components of the detection circuits are mounted on a board, for example a printed circuit board. This can be used to good advantage in that the plate 10 can be formed by a portion partly cut out from said printed circuit board. FIG. 5 shows a printed circuit board 70 (epoxy glass or other material) which comprises a cut-out 72 in the form of a U. This cut-out thus forms a strip which constitutes the plate 10 having an extremity 11 which is integral with the board 70 and a mobile extremity 14. The fulcrum 15 is then arranged underneath the mobile extremity 14. The cut-out in the printed circuit board 70 imparts a given flexibility to the extremity 11. The plate 10 is provided with the strain gauge bridges $R_1$-$R_8$ described with reference to FIG. 13 by etching and/or by deposition, for example by serigraphy.

The device for generating commands in accordance with the invention may be a remote control or may be incorporated in a keyboard. The apparatus thus manipulated may be:
  a delicate electromechanical positioning device: a microscope table,
  a regulator for electric power: lighting, motor, electric apparatus,
  a powerful lifting engine such as a crane or a rolling bridge
  a cursor on a table or on a screen of a computer or television monitor. In the latter case, the selection of a function or an object in a menu presented on the screen is concerned. The device may thus be incorporated in a keyboard so as to shift the cursor in all directions in an angular range of from 0° to 360°.

When a crane or a TV screen is concerned, the connection between the device and the apparatus to be operated may be realised either as a direct wire or cable connection or as an immaterial connection by way of an infrared or ultrasonic beam like in remote control systems for TV or audio apparatus.

Figure 15:
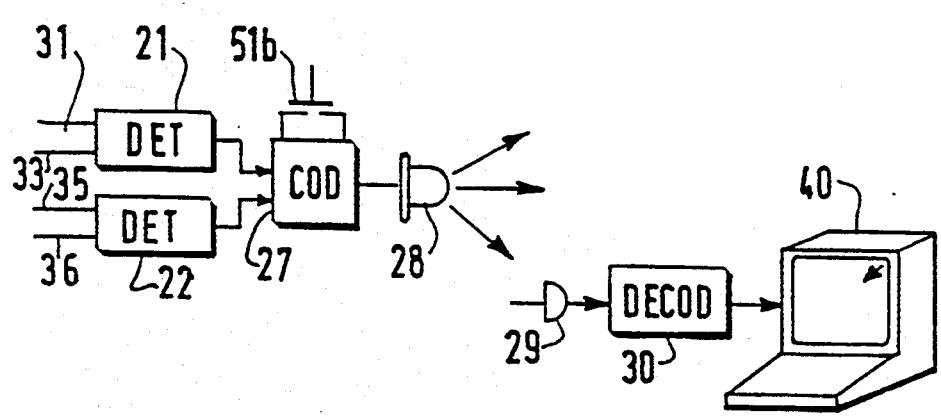
FIG. 15 shows a circuit diagram of a remote control without connection via a wire.

FIG. 15 shows an example of a remote control device without connection wire, for example utilizing infrared radiation. The voltage difference between the terminals 31 and 33 (between the terminals 35 and 36) is detected by the detection circuit 21 (the detection circuit 22). The output signals of the two detection circuits 21, 22 are encoded by an encoder 27 which applies the voltage or current pulses to the infrared light-emitting diode 28. These light pulses axe intercepted by a photosensitive diode 29 and identified by a decoder circuit 30 which supplies the controlled apparatus, for example a computer screen with a cursor, with movement or positioning commands which correspond to the mechanical action of the thumb on the button 16.

FIG. 18 shows the device 5 for generating multidirectional commands mounted in an appropriate casing which still allows for the button 16 to be manipulated by a finger. The shape of the device 5 is ergonomically adapted (for example elongated form for placing the fingers) so that it can be readily held in one hand.

Like devices of the joystick or mouse type used in combination with computers, this device may be provided with one or more other pushbuttons 51$b$ (FIG. 14), which act as a "click" either to validate a shift of a cursor or to execute a command. The pushbuttons of the detection circuits 21, 22 may be replaced by a common pushbutton 51$b$ acting on a common member, for example on the encoder 27. These pushbuttons can be operated by the same hand operating the button 16. Considering the small size of the plate of the device, the device can be doubled by providing on the side of the device a second sensitive plate and a second fulcrum so that it can respond to activities of another finger, notably an index finger. This results in a device for generating multifunctional commands which is ergonomically adapted to the hand.

In another embodiment, the fulcrum can be rendered to be mobile with respect to the support, its intrusion validating an electric command.

Figure 6A:
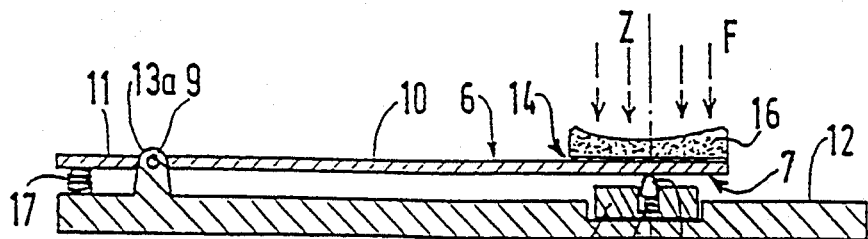
FIGS. 6A and 6B are a section view and a plan view, respectively, of a device in accordance with the invention, comprising a linkage in the form of a shaft and pads.
Figure 6B:
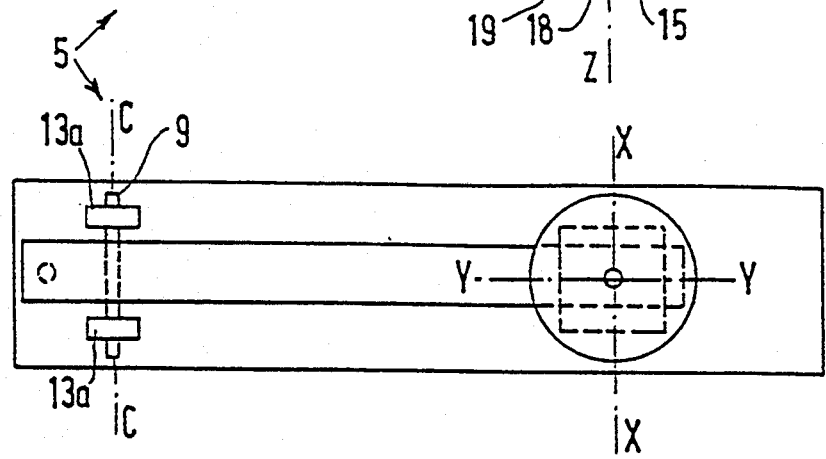

FIG. 6 is a sectional view (A) and a plan view (B) of such an embodiment of the device in accordance with the invention. The dimensions are not shown to scale. The device comprises a plate 10 and a microswitch 19 which are mounted on a support 12. The plate 10 comprises a first extremity 11, a second extremity 14, a first surface 6 and a second surface 7. The microswitch 19 comprises a head 15 which actuates at least one contact means. The head 15, being mounted on a spring 18, has a rounded or slightly pointed shape so as to form a fulcrum. Via the extremity 14, the plate 10 bears on the head 15 by way of its second surface 7. The other extremity 11 of the plate is connected to the support 12 via a linkage means. In FIG. 6 the linkage means is formed by a shaft 9 which is connected to the plate (for example, by gluing) and two pads 13a which are connected to the support 12. The plate can thus pivot about the shaft 9. Underneath the extremity 11 there may be provided a spring 17 in order to keep the extremity 14 in contact with the head 15 and to avoid any play. The force F is exerted on the head 15, in the direction of the axis ZZ, by means of a pushbutton 16 which is arranged on the first surface 6 near the extremity 14 of the plate.

Figure 7:
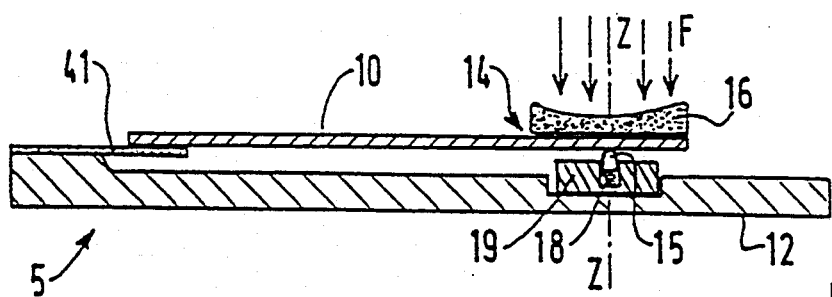
FIG. 7 is a sectional view of a device in accordance with the invention, comprising a linkage formed by a leaf spring.

FIG. 7 is a sectional view of a similar device in which the linkage means is formed by a leaf spring 41 which is connected to the plate 10 and to the support 12. It has the same function as the shaft 9 and the pads 13a. The elasticity of the leaf spring 41 on the one hand enables the extremity 14 of the plate to bear on the head 15 and on the other hand enables the plate 10 to be slightly rotated relative to the support 12.

When the force exerted by the finger acts perfectly in the direction of the axis ZZ of the head 15 of the microswitch, the latter slightly intrudes into the microswitch 9 against the force of the spring 18. The microswitch thus provides two effects:

on the one hand, it causes the opening (or closing) of an electric circuit, on the other hand, it provides a mechanical "click", offering a tactile sensation to a user. This physiological effect informs the user that the command has indeed been given.

When the force exerted by the finger is offset or inclined with respect to the axis ZZ, the device enables determination of the deviation of the orientation of the force on the plate, constituting a multi-directional command. In order to ensure that the head 15 continuous to act as a fulcrum, the head 15 should project sufficiently far above the upper edge of the microswitch 19 when it is depressed.

Figure 8A:
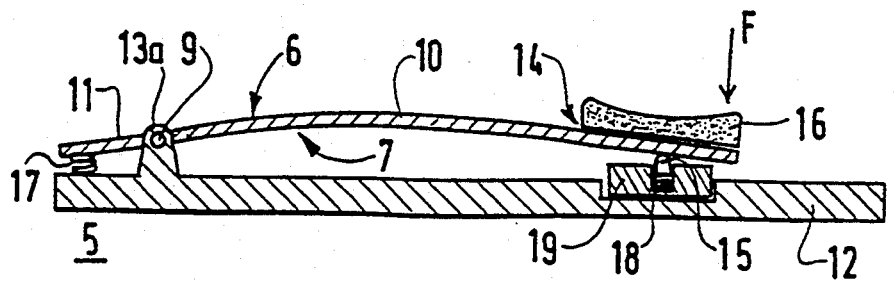
FIGS. 8A and 8B are sectional views of the device in accordance with the invention in two states of deflection.
Figure 8B:
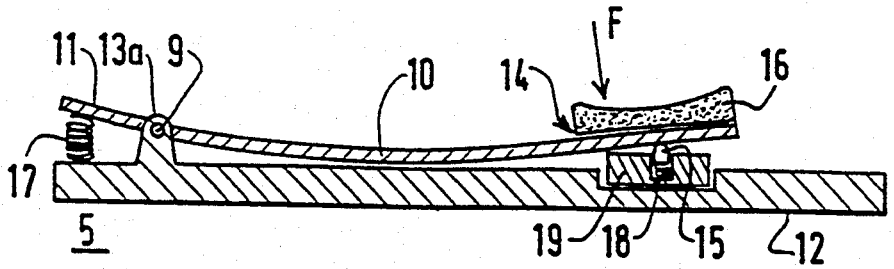

FIG. 8 is a sectional view of a device in which the plate 10 is deflected. The displacements are voluntarily exaggerated. When a finger, for example a thumb, exerts a force F on the button 16, this force may be applied either between the head 15 and the shaft 9 (FIG. 8-B) or beyond the head 15 (FIG. 8-A). In both cases, the plate is bent in the form of an arc of circle. The strain gauges which are provided, for example on the surface 6 of the plate thus change over from the compression to the elongation mode.

Figure 9:
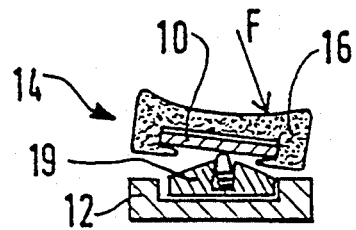
FIG. 9 is a partial sectional view of the device in accordance with the invention in a state of torsion.

FIG. 9 is a sectional view, taken perpendicularly to that of FIG. 8, along the axis ZZ. Under the influence of the force F, the extremity 14 may then be inclined from one side to the other, so that the plate is twisted.

The strain gauges arranged on the plate 10 then detect the deflection as well as torsional deformations of the sheet. When these gauges axe coupled with electric means for the processing and emission of appropriate signals, multi-directional commands axe obtained.

The detection of a significant deformation depends on the relative flexibilities of the plate 10, the spring 18, the configuration of the contact means of the microswitch, and possibly the spring 17.

When the contact means is activated by a very slight force (force F1), a simple touch, the microswitch can thus be used for activating the electric means for the processing and emission of appropriate signals.

When the contact means is activated by a greater applied force F2, the microswitch can be used to validate a command. Initiation and validation may be combined.

Figure 10A:
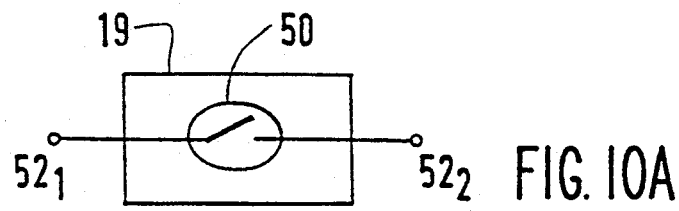
FIGS. 10A and 10B show two diagrams of a microswitch comprising one and two contact means, respectively.
Figure 10B:
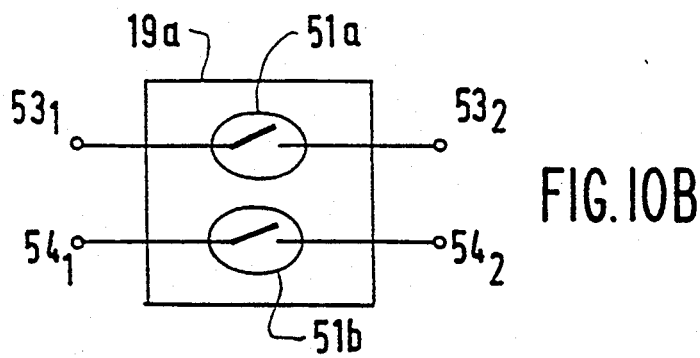
Figure 11:
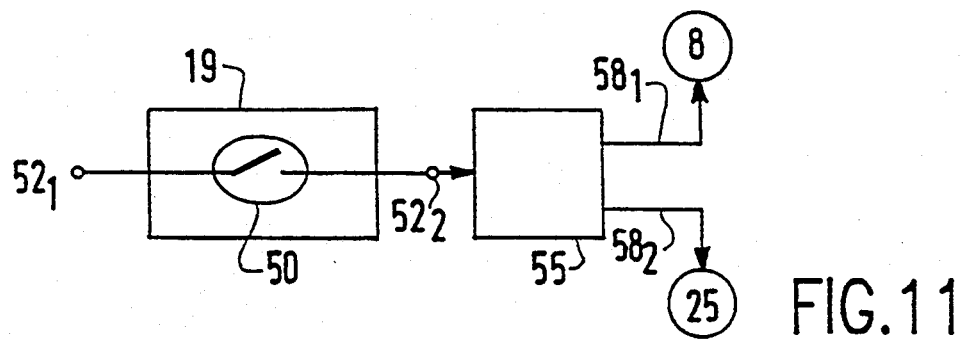
FIG. 11 shows a diagram of a microswitch comprising a contact means connected to an identification circuit.

In order to illustrate these possibilities, FIG. 10 shows two types 19, 19a of microswitches, comprising:

A- a single contact means 50
B- two contact means 51a, 51b.

When activated (deactivated), the contact means 50, 51a, 51b connect (disconnect) the pairs of terminals ($52_1$, $52_2$), ($53_1$, $53_2$), ($54_1$, $54_2$), respectively.

In the case of the single contact means 50, the force applied may be:

either a weak force F1, in which case the contact means 50 can be used for activation of the device, or a greater force F2, in which case the contact means 50 can be used to validate the electric signals from the strain gauges.

In the case of the two contact means 51a, 51b, one means is activated by a weak force F1 and the other means by a stronger force F2. Thus, during one and the same action a thumb will activate, by a simple cross pressure, first one of the contact means (F1) and subsequently the other contact means (F2).

It is also possible to use a microswitch having a single contact means 50 which is actuated twice in succession to initiate successively the activation and the validation. To this end (FIG. 11), one terminal $52_2$ of the microswitch 19 is connected to an identification circuit 55, for example a bistable circuit or a microprocesor which may be programmed so as to distinguish direction commands, "initiation" commands and "validation+ commands. The identification circuit 55 activates one ($58_1$) of its outputs during the first activation of the contact means 50 and activates the other output ($58_2$) during the second activation of the contact means 50. It can thus control the initiation or the validation (source 8, FIG. 13; block 25, FIG. 14; block 27, FIG. 15). In order to obtain the "initiation" function, the microswitch is connected to the source 8 either directly (if it comprises double contact means 51a, 51b) or via the identification circuit 55.

Figure 12:
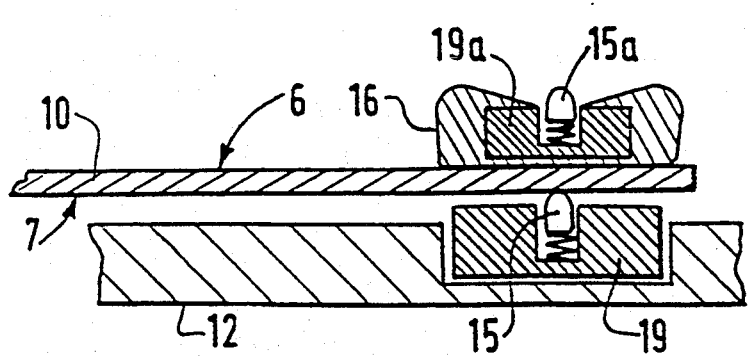
FIG. 12 is a partial sectional view of a device comprising two coaxial microswitches.

When there are two contact means 51a, 51b for the activation in cascade of first one contact means 51a and then the other contact means 51b, it is possible to use a microswitch in which a single head successively activates the two contact means as described above. However, it is equally well possible to use a microswitch having a single contact means (FIG. 10-A) which is arranged as described above and to combine its effect with another microswitch, arranged so as to be coaxial with the first microswitch, on the opposite surface of the plate 10. FIG. 12 shows a support 12 and a microswitch 19 provided with a head 15 which activates a single contact means. This microswitch 19 is arranged underneath the surface 7 of the plate 10 as already described. On the opposite surface 6 there is arranged another microswitch 19a having a head 15a which also activates a contact means (not shown). Said other microswitch 19a is arranged on the axis of the microswitch 19. It may be embedded in the button 16. In a preferred embodiment, the microswitch 19a is conceived to be activated by a weak force F1, and the microswitch 19 is conceived to be activated by a greater force F2 (F2 >F1). Thus, when the thumb rests on the button 16, it first activates the head 15a and subsequently the head 15. By pressing slightly in the direction of the axis ZZ, the user can initiate the device and subsequently, by inclining the thumb to select the relevant command, the user generates deformations of the plate and, by pressing harder, the user validates the electric signals from the strain gauges which characterize the state of deformation of the plate.

The functions of the two microswitches 19 and 19a can also be inverted, so that the microswitch 19 is activated by a weak force F1 and the other microswitch 19a is activated by a greater force F2, where F2>F1. The user can, for example press the periphery of the button 16 so as to select a command which is subsequently validated by the user by pressing the centre so as to affect the head 15a. The spring of the head 15a may even be adjusted for a large force F2 and the user, after having selected a command, should subsequently press harder so as to validate the command.

It is also possible for the microprocessor (identification circuit 55) to differentiate between the various actions by taking into account the speed at which the pressures are applied.

It is also possible to combine the other microswitch 19a with the fixed fulcrum of the principal embodiment.

When the fulcrum (15) is fixed, the contact means 50, 51a, 51b may be formed by independent pushbuttons. These may also be present in the case of the mobile fulcrum.

The measurement of the deformations incurred by the plate 10 as well as their use are realised in the manner described for the principal embodiment.

Figure 16:
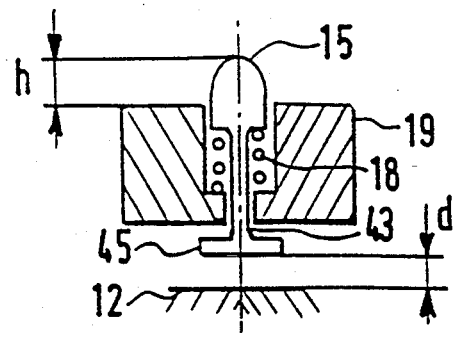
FIG. 16 is a sectional view of a means for limiting the force exerted on the microswitch.

The force is exerted on the head 15 of the microswitch by bearing on the plate 10. A microswitch of this kind has rupture limits. Therefore, it is desirable to take into account the cases where a user tends to press too hard on the microswitch so that it could be destroyed. FIG. 16 shows a means for limiting the force exerted on the microswitch. To this end, the head 15 of the microswitch 19 is connected to a stem 43 which extends through the body of the microswitch 19. This stem will bear, either directly or by way of a foot 45, for example on the support 12. The distance between the foot 45 and the support 12 is controlled so that when the intrusion of the foot is maximum, the head 15 projects sufficiently (distance h) for the head 15 to continue to form a fulcrum for the plate 10. Thus, when the foot 45 is in contact with the support 12, any excess force exerted will be taken up by the support 12 and not by the microswitch 19.

The various elements forming part of the device described above may be accommodated in a housing. In the housing there may be arranged the support 12, the plate 10 and the other members, notably electric members as described above. However, the housing is preferably designed so as to be adapted to the particularities of the device.

Figure 17:
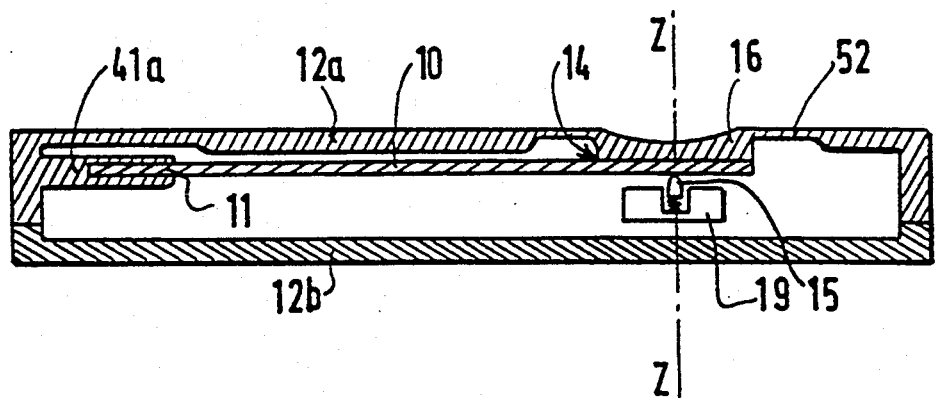
FIG. 17 is a sectional view of a device comprising a housing having deformable portions.

FIG. 17 shows a diagram of an embodiment of such a housing for the particular embodiment of the invention. It can be readily adapted to the principal embodiment. The support 12 is in this case formed by the housing itself which comprises an upper portion 12a and a lower portion 12b. The button 16 is incorporated in the upper portion 12a, but in order to impart mobility to the button, it is connected to the upper portion 12a by way of a deformable peripheral ring 52. This aspect can be realised either by reducing the thickness of the material of this peripheral ring or by utilizing a flexible filler material (for example, an elastomer) or by imparting an appropriate shape, for example an accordion shape, to the ring. Tightness at the level of the button is thus ensured. Via its extremity 14, the plate 10 is connected to the button 16, for example by gluing. The other extremity 11 is attached to the housing by way of a plate 41a which extends as a cantilever inside the housing. Thus, by choosing the dimensions of the plate 41a, an elastic portion appropriate for the displacement of the plate 10 can be obtained. The sheet 41a may be made of a plastic material, forming a projection, and may be realised during the moulding of the housing. The microswitch 19 is arranged underneath the extremity 14 as described above.

The construction of the housing in two portions 12a, 12b allows for easier realisation of the device. After the moulding of the upper portion 12a, the various members described, including the electric members for transmitting the commands, are mounted, after which the housing is closed by way of the lower portion 12b. In the case of infrared transmission, a transparent window is provided.

A housing of this kind may thus constitute a portable remote control or be used in a fixed position, for example as a wall box for the control of actuators.

For the described control device it has been specified that the force could be exerted at any zone of the pushbutton, thus making the device suitable for multi-directional commands. However, it will be evident that it is also possible to consider only given preferred directions, so that a command device is obtained for a single direction, two directions, three directions etc. For example, a bidirectional device may form a stop/go command.

FIG. 18 shows the device 5 for generating multi-directional commands in an appropriate housing which allows for the button 16 to be manipulated by a finger in the directions XX, YY as well as in intermediate directions. Displacement of the finger around the periphery of the button 16 allows for angular commands which may be utilized to generate a rotation of a real or an immaterial object of the controlled apparatus, for example:

rotation of a microscope table,
rotation of a crane
rotation of an image on a screen.

This angular control is attractively obtained without rotation of the device itself. Only the pivoting of the plate on the head of the microswitch is impressed. Therefore, no wear of rotary parts occurs. The shape (for example, elongate) and operation of the device 5 are ergonomically adapted so as to enable easy handling by means of only one hand.

A multiple device can be formed by accommodating several elementary devices in the same housing, each device comprising a plate 10 and a fulcrum 15 so that the multiple device responds to actions exerted by different fingers. This offers a special advantage when the device is inserted in a keyboard.

What is claimed:

1. A device for generating multi-directional commands, comprising at least one elongate member formed by a plate having a first extremity and a second extremity, the member being provided with strain gauges ($R_1$–$R_8$) which detect the multi-directional deformation incurred by the member under the influence of a force exerted near the second extremity, the first extremity cooperating with a support, the second extremity bearing, by way of a surface of the plate, on a fulcrum which is coupled to the support.

2. The device as claimed in claim 1, further including a button coupled to the second extremity wherein the force is exerted by pressing the button against the fulcrum in a predetermined direction against the fulcrum.

3. The device as claimed in claim 2, wherein the fulcrum is a microswitch, and wherein the microswitch includes contact means for activating the microswitch, the button serving to activate the contact means and the device further including linkage means for pivotably coupling the first extremity of the plate with the support.

4. The device as claimed in claim 2, further including a housing provided with deformable portions which serve to connect the button to a portion of the housing.

5. The device as claimed in claim 2, wherein the plate is a partly cut board whereby the first extremity of the plate remains integral with the board and the second extremity of the plate is mobile.

6. The device as claimed in claim 2, further including a housing provided with deformable portions which serve to connect the button to a portion of the housing.

7. The device as claimed in claim 3, wherein the contact means controls a validation of a measurement signal supplied by the strain gauges.

8. The device as claimed in claim 3, wherein the linkage means includes a shaft which is mounted on pads and coupled to the first extremity.

9. The device as claimed in claim 3, wherein the linkage means is formed by an elastic plate coupled to the support and the first extremity.

10. The device as claimed in claim 3, further including force limiting means responsive to the microswitch for limiting the force exerted on the microswitch.

11. A device as claimed in claim 7, wherein the contact means includes a a first contact member being activated by a small applied force F1 and a second contact member being activated by a greater applied force F2 (F2>F1), the first contact member for controlling an activation of the device and the second contact member for controlling the validation of said measurement signal.

12. The device as claimed in claim 7, wherein the linkage means includes a shaft which is mounted on pads.

13. The device as claimed in claim 7, wherein the linkage means is formed by an elastic plate.

14. The device as claimed in claim 1, wherein the plate is a partly cut board so that the first extremity of the plate remains integral with the board and the second extremity of the plate is mobile.

* * * * *